US011513399B2

(12) United States Patent
Huang (10) Patent No.: US 11,513,399 B2
(45) Date of Patent: Nov. 29, 2022

(54) DISPLAY PANEL, DISPLAY DEVICE, AND MANUFACTURING METHOD (71) Applicant: HKC CORPORATION LIMITED, Shenzhen (CN)

(72) Inventor: Shishuai Huang, Chongqing (CN)

(73) Assignee: HKC CORPORATION LIMITED, Shenzhen (CN)

( * ) Notice: Subject to any disclaimer, the term of this patent is extended or adjusted under 35 U.S.C. 154(b) by 699 days.

(21) Appl. No.: 16/349,980

(22) PCT Filed: Nov. 29, 2018

(86) PCT No.: PCT/CN2018/118045
§ 371 (c)(1),
(2) Date: May 14, 2019

(87) PCT Pub. No.: WO2020/087616
PCT Pub. Date: May 7, 2020

(65) Prior Publication Data
US 2021/0356817 A1 Nov. 18, 2021

(30) Foreign Application Priority Data
Oct. 30, 2018 (CN) .......................... 201811273810.9

(51) Int. Cl.
G02F 1/13 (2006.01)
G02F 1/1343 (2006.01)
(Continued)

(52) U.S. Cl.
CPC ...... *G02F 1/134309* (2013.01); *G02F 1/1368* (2013.01); *G02F 1/13439* (2013.01); *G02F 1/136222* (2021.01)

(58) Field of Classification Search
CPC ........... G02F 1/134309; G02F 1/13439; G02F 1/136222; G02F 1/1368; G02F 1/13624;
(Continued)

(56) References Cited

U.S. PATENT DOCUMENTS 9,972,256 B2 * 5/2018 Kang ................... G09G 3/2003
10,062,737 B2 * 8/2018 Hong .................. H01L 27/3218
(Continued)

FOREIGN PATENT DOCUMENTS

| CN | 102749751 A | 10/2012 |
|---|---|---|
| CN | 103901682 A | 7/2014 |
| CN | 104460077 A | 3/2015 |

OTHER PUBLICATIONS

International Search Report-issued in corresponding international application No. PCT/CN2018/118045, dated Jul. 26, 2019.
(Continued)

*Primary Examiner* — S M Sohel Imtiaz (57) ABSTRACT

The present application discloses a display panel, a display device, and a manufacturing method. The display panel includes a plurality of first pixels and a plurality of second pixels, where a color of each first pixel is different from that of each second pixel; the first pixels are configured as a high domain region, and the second pixels are configured as a low domain region; the number of alignment regions of the high domain region is greater than that of alignment regions of the low domain region; and the lightness of the first pixels is higher than that of the second pixels.

5 Claims, 4 Drawing Sheets (51) Int. Cl.
*G02F 1/1362* (2006.01)
*G02F 1/1368* (2006.01)

(58) Field of Classification Search
CPC ........... G02F 1/133707; G02F 2201/52; G02F 1/1333; G02F 1/1337
See application file for complete search history.

(56) References Cited

U.S. PATENT DOCUMENTS

| | | | |
|---|---|---|---|
| 10,157,560 B2* | 12/2018 | Yang | G09G 3/2003 |
| 10,217,436 B2* | 2/2019 | Lee | G09G 5/02 |
| 10,347,664 B2* | 7/2019 | Wang | H01L 29/78675 |
| 10,977,975 B2* | 4/2021 | Feng | G09G 3/20 |
| 2008/0316413 A1* | 12/2008 | Cho | G02F 1/134309 |
| | | | 349/144 |
| 2012/0268357 A1* | 10/2012 | Shih | G09G 3/3648 |
| | | | 345/88 |
| 2016/0116808 A1* | 4/2016 | Higano | G02F 1/133512 |
| | | | 349/110 |
| 2017/0059914 A1* | 3/2017 | Huang | H01L 27/1248 |
| 2017/0059944 A1* | 3/2017 | Xu | G02F 1/13439 |
| 2018/0356662 A1* | 12/2018 | Hao | G02F 1/136286 |

OTHER PUBLICATIONS

Written Opinion of the International Searching Authority for No. PCT/CN2018/118045.
First Office Action from china patent office in a counterpart Chinese patent Application 201811273810.9, dated Mar. 25, 2020 (6 pages).

* cited by examiner

DISPLAY PANEL, DISPLAY DEVICE, AND MANUFACTURING METHOD

The present application claims priority to Chinese Patent Application No. CN201811273810.9, filed with National Intellectual Property Administration, PRC on Oct. 30, 2018, and entitled "DISPLAY PANEL, DISPLAY DEVICE, AND MANUFACTURING METHOD", which is incorporated herein by reference in its entirety.

TECHNICAL FIELD

The present application relates to the technical field of display, and in particular, to a display panel, a display device, and a manufacturing method.

BACKGROUND

The statements herein merely provide background information related to the present application and do not necessarily constitute the prior art.

With the development and advancement of technology, liquid crystal displays are currently the most widely used displays on the market, especially for LCD TVs.

With the gradual increase of the resolution of a display panel, the sizes of pixels become smaller and smaller, and the aperture ratio is also smaller and smaller. The brightness of the backlight should be greatly improved to meet the brightness demand. High-brightness backlight needs to increase power, which will consume more power, and the corresponding cost will also increase. At the same time, the environmental power consumption will become larger, which is not conducive to environmental protection. Therefore, high-resolution liquid crystal displays require high transmittance to reduce backlight power consumption and costs. After liquid crystal molecules are arranged and oriented, when the liquid crystal molecules are viewed at different angles, the color shift is generated due to the different transmittance of the liquid crystal molecules; the color shift occurs at a large viewing angle, and thus the influence of the color shift on the display needs to be reduced.

SUMMARY

An objective of the present application is to provide a display panel, a display device, and a manufacturing method to eliminate color shift generated by liquid crystal display.

To achieve the above objective, the present application provides a display panel, which includes:

a plurality of first pixels and a plurality of second pixels, where the plurality of first pixels have the same color, and the plurality of second pixels have the same color; the color of the first pixels is different from that of the second pixels; the first pixels are configured as a high domain region, and the second pixels are configured as a low domain region; the number of alignment regions of the high domain region is greater than that of alignment regions of the low domain region; and the lightness of the first pixels is higher than that of the second pixels.

Optionally, the display panel includes white pixels; the white pixels are the first pixels, and the white pixels are correspondingly configured as a high domain region.

Optionally, the display panel includes third pixels and fourth pixels; the white pixels are the first pixels, and the white pixels are correspondingly configured as a high domain region; and the second pixels, the third pixels, and the fourth pixels are correspondingly configured as low domain regions.

Optionally, the display panel includes fourth pixels; the lightness of the fourth pixels is lower; and the fourth pixels are correspondingly configured as a high domain region.

Optionally, the display panel includes third pixels and fourth pixels; the white pixels are the first pixels, and the white pixels are correspondingly configured as a high domain region; the third pixels and the second pixels correspond to a low domain region, and the fourth pixels correspond to a high domain region; the lightness of the fourth pixels is lower, and the lightness of the first pixels is higher.

Optionally, the display panel includes third pixels; the first pixels are green pixels, the second pixels are red pixels, and the third pixels are blue pixels; the blue pixels are correspondingly configured as a low domain region, the red pixels are correspondingly configured as a low domain region, and the green pixels are correspondingly configured as a high domain region.

Optionally, the low domain region has four alignment regions, and the high domain region has eight alignment regions.

Optionally, the display panel includes gate scan layers and common lines, and the first pixels each include a main pixel and sub-pixels; the first pixels corresponding to the same gate scan layer are provided with three thin film transistors; drain electrodes of two of the thin film transistors are connected with the main pixel and the sub-pixels respectively, and source electrodes are connected with a same data line; a source electrode of the other thin film transistor is connected with the sub-pixels corresponding to the upper gate scan layer, and a drain electrode is connected to the common lines.

The present application also discloses a manufacturing method for a display panel; the display panel includes a plurality of first pixels and a plurality of second pixels, and the manufacturing method includes steps of:

setting a plurality of first pixels and a plurality of second pixels, where colors corresponding to the first pixels and the second pixels are different; where the first pixels are configured as a high domain region, and the second pixels are configured as a low domain region; the number of alignment regions of the high domain region is greater than that of alignment regions of the low domain region; and the lightness of the first pixels is higher than that of the second pixels.

Optionally, the step of setting a plurality of first pixels and a plurality of second pixels includes:

disposing a pixel electrode of the first pixels and a pixel electrode of the second pixels on a first substrate of the display panel; and disposing color photoresist layers corresponding to the first pixels and the second pixels on a second substrate of the display panel.

The present application also discloses a display device including the display panel as described above.

In this solution, the display panel includes first pixels and second pixels; the number of the first pixels and the number of the second pixels are plural; the first pixels are correspondingly configured as a high domain region, and the second pixels are correspondingly configured as a low domain region. The number of alignment regions of the first pixels and the number of alignment regions of the second pixels are different. With respect to a solution of configuring the first pixels and the second pixels as high domain regions, the number of the alignment regions of the high domain regions is large, and the configuration viewing angle of the high domain regions is good, and the configuration of the high domain regions reduces the aperture area and thus sacrifices the aperture ratio; with respect to a solution of configuring the first pixels and the second pixels as low domain regions, the configuration of the low domain regions allows the aperture area to be relatively large and the aperture ratio to be high. However, the viewing angle will be poor, so that the customer experience will be poor. In the present application, the high domain region and the low domain region are in hybrid configuration; the configuration of the low domain region ensures a certain transmittance, and the configuration of the high domain region improves color shift of a large viewing angle, so that the hybrid configuration of the high domain region and the low domain region improves color shift and the quality of the display panel at a large viewing angle of the product while ensuring a certain transmittance.

BRIEF DESCRIPTION OF DRAWINGS

The drawings are included to provide further understanding of embodiments of the present application, which constitute a part of the specification and illustrate the embodiments of the present application, and describe the principles of the present application together with the text description. Apparently, the accompanying drawings in the following description show merely some embodiments of the present application, and a person of ordinary skill in the art may still derive other accompanying drawings from these accompanying drawings without creative efforts. In the accompanying drawings.

DETAILED DESCRIPTION

The specific structure and function details disclosed herein are merely representative, and are intended to describe exemplary embodiments of the present application. However, the present application can be specifically embodied in many alternative forms, and should not be interpreted to be limited to the embodiments described herein.

In the description of the present application, it should be understood that, orientation or position relationships indicated by the terms "center", "transversal", "upper", "lower", "left", "right", "vertical", "horizontal", "top", "bottom", "inner", "outer", etc. are based on the orientation or position relationships as shown in the drawings, for ease of the description of the present application and simplifying the description only, rather than indicating or implying that the indicated device or element must have a particular orientation or be constructed and operated in a particular orientation. Therefore, these terms should not be understood as a limitation to the present application. In addition, the terms "first", "second" are merely for a descriptive purpose, and cannot to be understood to indicate or imply relative importance, or implicitly indicate the number of the indicated technical features. Hence, the features defined by "first" and "second" can explicitly or implicitly include one or more features. In the description of the present application, "a plurality of" means two or more, unless otherwise stated. In addition, the term "include" and any variations thereof are intended to cover a non-exclusive inclusion.

In the description of the present application, it should be understood that, unless otherwise specified and defined, the terms "install", "connected with", "connected to" should be comprehended in a broad sense. For example, these terms may be comprehended as being fixedly connected, detach ably connected or integrally connected; mechanically connected or electrically connected; or directly connected or indirectly connected through an intermediate medium, or in an internal communication between two elements. The specific meanings about the foregoing terms in the present application may be understood by those skilled in the art according to specific circumstances.

The terms used herein are merely for the purpose of describing the specific embodiments, and are not intended to limit the exemplary embodiments. As used herein, the singular forms "a", "an" are intended to include the plural forms as well, unless otherwise indicated in the context clearly. It will be further understood that the terms "comprise" and/or "include" used herein specify the presence of the stated features, integers, steps, operations, elements and/or components, but do not preclude the presence or addition of one or more other features, integers, steps, operations, elements, components and/or combinations thereof.

Liquid crystal displays are currently the most widely used displays on the market, especially for LCD TVs. With the gradual increase of the resolution, the sizes of pixels become smaller and smaller, and the aperture ratio is also smaller and smaller. The brightness of the backlight should be greatly improved to meet the brightness demand. High-brightness backlight needs to increase power, which will consume more power, and the corresponding cost will also increase. At the same time, the environmental power consumption will become larger, which is not conducive to environmental protection. Therefore, high-resolution liquid crystal displays require high transmittance to reduce backlight power consumption and costs.

Figure 1:
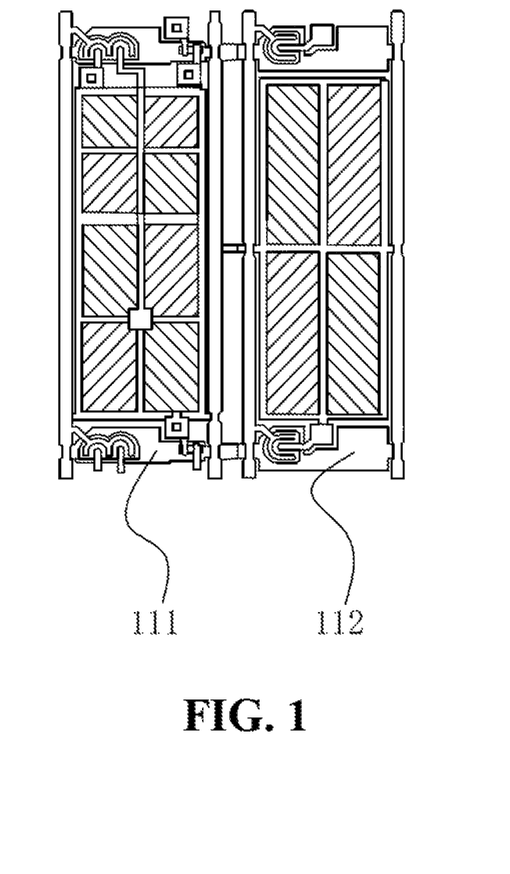
FIG. 1 is a schematic view of configuring first pixels of a display panel as a high domain region and configuring second pixels as a low domain region according to an embodiment of the present application.

Referring to FIG. 1, an embodiment of the present application discloses a display panel 110, which includes:

a plurality of first pixels 111 and a plurality of second pixels 112, where the plurality of first pixels 111 have the same color, and the plurality of second pixels 112 have the same color; the color of the first pixels 111 is different from that of the second pixels 112; the first pixels 111 are configured as a high domain region, and the second pixels 112 are configured as a low domain region; the number of alignment regions of the high domain region is greater than that of alignment regions of the low domain region; and the lightness of the first pixels 111 is higher than that of the second pixels 112.

In this solution, the display panel 110 includes first pixels 111 and second pixels 112; the number of the first pixels 111 and the number of the second pixels 112 are plural; the first pixels 111 are correspondingly configured as a high domain region, and the second pixels 112 are correspondingly configured as a low domain region. The number of alignment regions of the first pixels 111 and the number of alignment regions of the second pixels 112 are different. With respect to a solution of configuring the first pixels 111 and the second pixels 112 as high domain regions, the number of the alignment regions of the high domain regions is large, and the configuration viewing angle of the high domain regions is good, and the configuration of the high domain regions reduces the aperture area and thus sacrifices the aperture ratio; with respect to a solution of configuring the first pixels 111 and the second pixels 112 as low domain regions, the configuration of the low domain regions allows the aperture area to be relatively large and the aperture ratio to be high. However, the viewing angle will be poor, so that the customer experience will be poor. In this solution, the high domain region and the low domain region are in hybrid configuration; the configuration of the low domain region ensures a certain transmittance, and the configuration of the high domain region improves color shift of a large viewing angle, so that the hybrid configuration of the high domain region and the low domain region improves color shift and the quality of the display panel 110 at a large viewing angle of the product while ensuring a certain transmittance.

Figure 2:
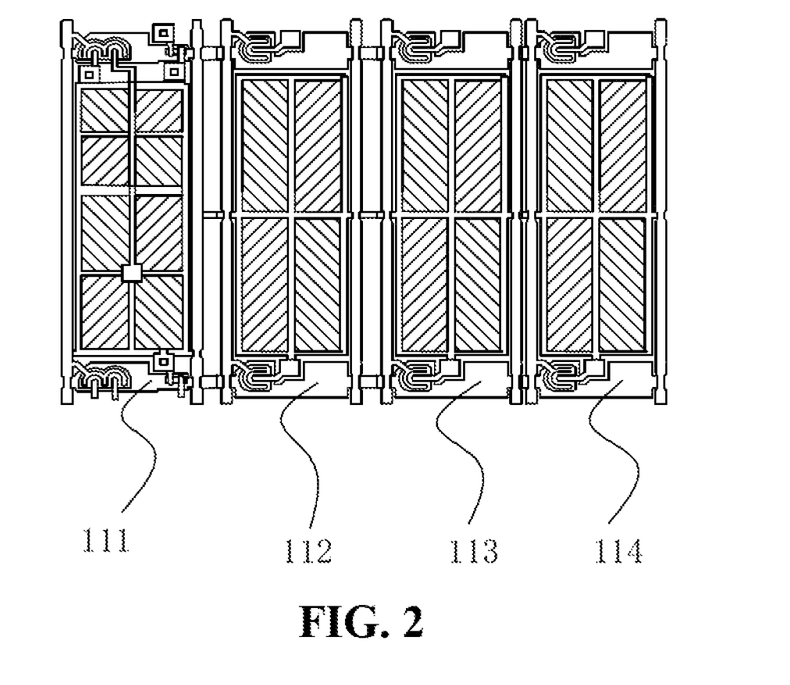
FIG. 2 is a schematic view of configuring brighter pixels of display panel RGBW as a high domain region according to an embodiment of the present application.

In one or more embodiments, referring to FIG. 2, the display panel 110 includes white pixels; the white pixels are the first pixels 111, and the white pixels are correspondingly configured as a high domain region.

In this solution, the first pixels 111 are white pixels and are correspondingly configured as a high domain region. For the display panel 110 provided with white pixels, the white pixels are brighter relative to the pixels of other colors; when the white pixels are correspondingly configured as a high domain region, although the transmittance of the white pixels is affected, because the white pixels are brighter, the effect on the overall transmittance is not very large, and a certain transmittance can be ensured; at the sacrifice of a small transmittance, the white pixel configuration as a high domain region can greatly improve the large viewing angle color shift, thereby improving the quality of the product against color shift at a large viewing angle. In addition, the lightness of the white pixels configured as the high domain region is lowered, closer to that of each low domain region of other colors, and the overall lightness uniformity of the panel is better.

In one or more embodiments, the display panel 110 includes third pixels 113 and fourth pixels 114; the white pixels are the first pixels 111, and the white pixels are correspondingly configured as a high domain region; and the second pixels 112, the third pixels 113, and the fourth pixels 114 are correspondingly configured as low domain regions.

The same column of pixels is pixels of the same color.

In this solution, the display panel 110 includes first pixels 111, second pixels 112, third pixels 113, and fourth pixels 114, where the white pixels are the first pixels 111, red pixels are the second pixels 112, green pixels are the third pixels 113, and blue pixels are the fourth pixels 114. The white pixels are correspondingly configured as a high domain region, and pixels of other colors are configured as low domain regions; the lightness of the white pixels is higher, and the lightness proportion is large in the entire display panel 110. Even if the setting of the high domain region reduces the transmittance a little, the influence on the overall transmittance is small; therefore, the display panel 110 includes four kinds of pixels; brighter pixels are configured as a high domain region, and the other three kinds of pixels are configured as low domain regions, which not only ensures the transmittance, but also improves the color shift problem through the high domain region, and improves the quality of the product against color shift at a large viewing angle.

In one or more embodiments, the display panel 110 includes fourth pixels 114; the lightness of the fourth pixels 114 is lower, and the fourth pixels 114 are correspondingly configured as a low domain region.

In this solution, the display panel 110 includes the fourth pixels 114; the first pixels 111 and the fourth pixels 114 are correspondingly configured as high domain regions, and the second pixels 112 are correspondingly configured as a low domain region. The lightness of the first pixels 111 is higher than that of the second pixels 112, and the lightness of the fourth pixels 114 is lower relative to the lightness of other pixels; brighter and darker pixels are configured as high domain regions, so that higher lightness is reduced to make the overall lightness difference reduced, and thus the overall lightness uniformity of the panel is better.

Figure 3:
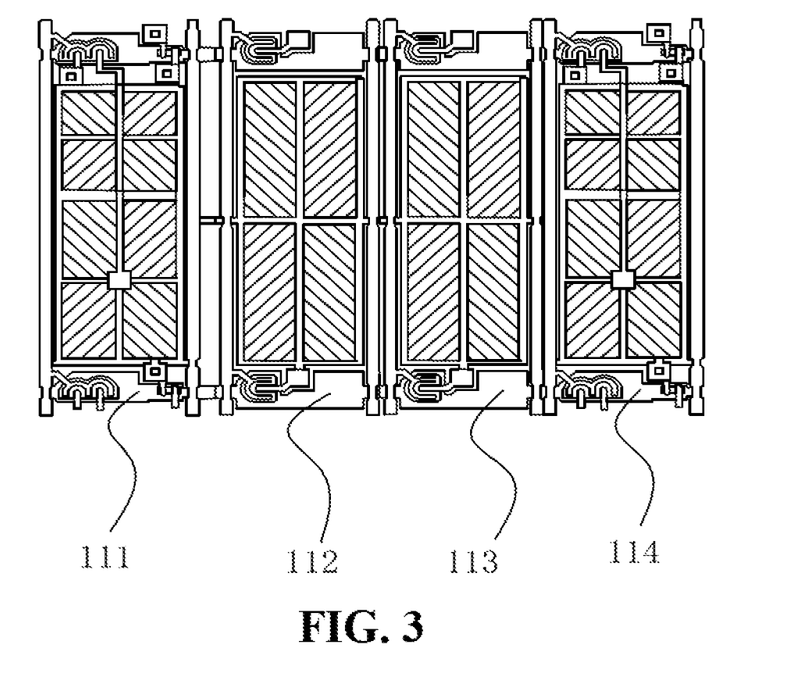
FIG. 3 is a schematic view of configuring brighter pixels and darker pixels of display panel RGBW as high domain regions according to an embodiment of the present application.

In one or more embodiments, referring to FIG. 3, the display panel 110 includes third pixels 113 and fourth pixels 114; white pixels are first pixels 111, and the white pixels are correspondingly configured as a high domain region; the third pixels 113 and second pixels 112 correspond to low domain regions, and the fourth pixels 114 correspond to a high domain region; the lightness of the fourth pixels 114 is lower and the lightness of the first pixels 111 is higher.

In this solution, the display panel 110 includes first kinds of pixels; the white pixels are the first pixels 111 and correspondingly configured as a high domain region; the fourth pixels 114 are configured as a high domain region; and the second pixels 112 and the third pixels 113 are correspondingly configured as low domain regions. The white pixel is brighter among the four pixels, and the white pixel is brighter in lightness relative to the pixels of other colors; when the white pixels are correspondingly configured as the high domain region, although the white pixel transmittance is affected, the influence on the overall transmittance is not very large because the white pixels are brighter, and a certain transmittance can be ensured; the lightness of the fourth pixel 114 is lower; because the lightness of the fourth pixel 114 itself with a lower lightness does not contribute much to the lightness of the overall panel, the fourth pixels 114 are correspondingly configured as a high domain region, and the lightness of the fourth pixels 114 does not change much. Therefore, brighter pixels and darker pixels are configured as high-domain regions, and at the expense of a small transmittance, the large viewing angle color shift can be greatly improved, thereby improving the quality of large viewing angle color shift of the product.

Figure 4:
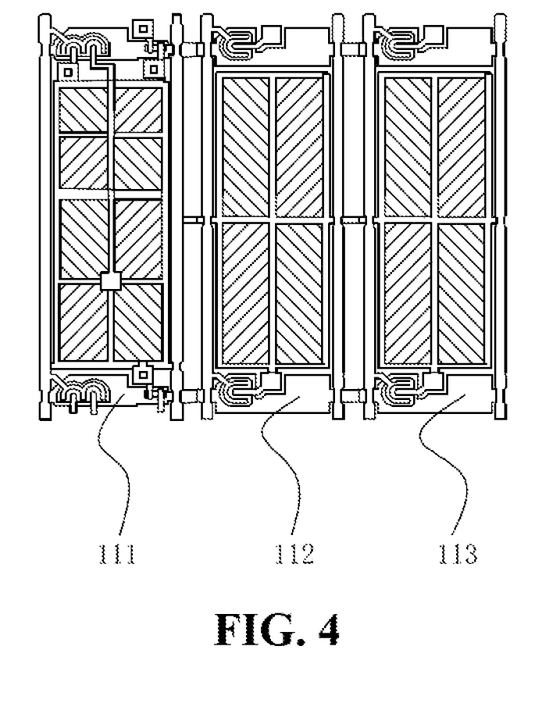
FIG. 4 is a schematic view of configuring brighter pixels of display panel RGB as a high domain region according to an embodiment of the present application.

In one or more embodiments, referring to FIG. 4, the display panel 110 includes third pixels 113; first pixels 111 are green pixels, second pixels 112 are red pixels, and the third pixels 113 are blue pixels; the blue pixels are correspondingly configured as a low domain region, the red pixels are correspondingly configured as a low domain region, and the green pixels are correspondingly configured as a high domain region.

In this solution, the display panel 110 includes three kinds of pixels which are the first pixels 111, the second pixels 112, and the third pixels 113, respectively, where the first pixels 111 are green pixels, and the second pixels 112 are red pixels, and the third pixels 113 are blue pixels; the blue pixels and the red pixels are correspondingly configured as low domain regions, and the green pixels are correspondingly configured as a high domain region. The lightness ratio of the blue pixel, the red pixel, and the green pixel corresponds to 1:2:10, the green pixel is brighter; the green pixels are correspondingly configured as a high domain region, because the brighter green pixel accounts for a larger lightness proportion among three pixels, even if there is a little loss, the influence on the overall lightness is not very high, and the color shift can also be improved by correspondingly configuring the green pixels as a high domain region.

In one or more embodiments, the low domain region has four alignment regions, and the high domain region has eight alignment regions.

RGBW is a design that can significantly improve the panel transmittance. A high-transmission W photoresist is added in an illustrative RGB photoresist, and the three colors are changed to four colors, so that the transmittance of RGBW is improved by 1.5 times.

$$\tfrac{1}{3}(R)+\tfrac{1}{3}(G)+\tfrac{1}{3}(B)+1(W)=1.5(\tfrac{1}{3}(R)+\tfrac{1}{3}(G)+\tfrac{1}{3}(B)+\tfrac{1}{3}(R))$$

The liquid crystal display in the high-resolution vertical alignment (VA) mode has a small pixel size. If the eight alignment regions are designed to improve the viewing angle, the aperture ratio will be further sacrificed. If the eight alignment regions are not designed, the viewing angle will be poor, so that the customer experience will he poor. In this solution, the first pixels 111 are correspondingly configured as a high domain region, and the number of alignment regions of the first pixels 111 is eight; the second pixels 112 are correspondingly configured as a low domain region, and the number of alignment regions of the second pixels 112 is four. The number of alignment regions of the first pixels 111 is eight The first pixels 111 each include a main pixel and sub-pixels; the first pixels corresponding to the same gate scan layer are provided with three thin film transistors; drain electrodes of two of the thin film transistors are connected with the main pixel and the sub-pixels respectively, and source electrodes are connected with a same data line; a source electrode of the other thin film transistor is connected with the sub-pixels corresponding to the upper gate scan layer, and a drain electrode is connected to common lines. The thin film transistors of the gate scan layer of the same layer are simultaneously switched on, the main pixel and the sub-pixels are simultaneously charged, and the charge amount of the main pixel and the sub-pixels are the same; when thin film transistor switches of the upper layer are switched off, the thin film transistors of the next layer are switched on. Since the sub-pixels of the upper layer and a common electrode have overlapping areas, a discharge capacitor is generated, and the power of the sub-pixels is lost to some extent. At this time, the voltage of the main pixel is greater than that of the sub-pixels, and the lightness of the sub-pixels is lower than that of the main. pixel. According to the characteristics of the vertical alignment (VA) type, when the display panel 110 is of a large size, when viewed from different viewing angles, the lightness at both sides is higher, and unevenness in brightness and darkness may occur. The, pixels are correspondingly configured as the high domain region for matching, and the brighter lightness at the two sides matches the darker lightness, thereby improving color shift. The second pixels 112 have four alignment regions, which improves the transmittance with respect to the case where the number of the alignment regions is eight. This solution improves the color shift as a whole while at the expense of a very small transmittance.

Figure 5:
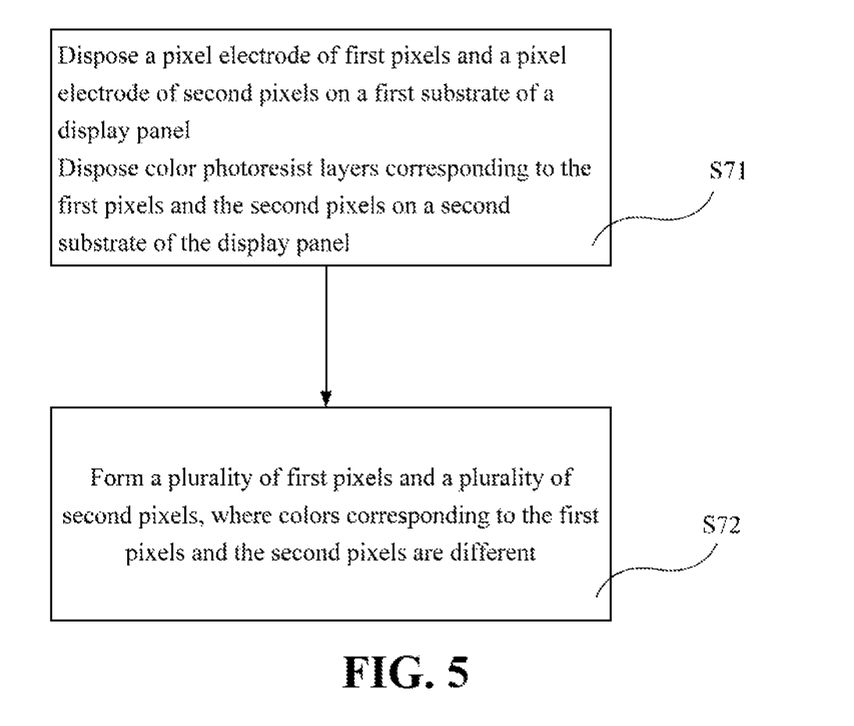
FIG. 5 is a flow chart of a manufacturing method for a display panel according to an embodiment of the present application.

As another embodiment of the present application, referring to FIG. 5, a manufacturing method for a display panel 110 is disclosed, and the method includes:

S71: Dispose a pixel electrode of first pixels 111 and a pixel electrode of second pixels 112 on a first substrate of the display panel 110, where the disposed electrode of the first pixels 111 includes pixel electrodes of main pixels and sub-pixels; dispose two thin film transistors on the first substrate, connect one of the thin film transistors with the main pixels to charge the main pixels, and connect the other thin film transistor with the sub-pixels to charge the sub-pixels.

Color photoresist layers corresponding to the first pixels 111 and the second pixels 112 are disposed on a second substrate of the display panel 110. Certainly, it is also possible to provide the color photoresist layer and the pixel electrode layer on the same substrate.

S72: Dispose a plurality of first pixels 111 and a plurality of second pixels 112, where colors corresponding to the first pixels 111 and the second pixels are different.

The first pixels 111 are configured as a high domain region, and the second pixels 112 are configured as a low domain region, and the number of alignment regions of the high domain region is greater than that of alignment regions of the low domain region; and the lightness of the first pixels 111 is higher than that of the second pixels 112.

In this solution, the display panel 110 includes first pixels 111 and second pixels 112; the number of the first pixels 111 and the number of the second pixels 112 are plural; the first pixels 111 are correspondingly configured as a high domain region, and the second pixels 112 are correspondingly configured as a low domain region. The number of alignment regions of the first pixels 111 and the number of alignment regions of the second pixels 112 are different. With respect to a solution of configuring the first pixels 111 and the second pixels 112 as high domain regions, the number of the alignment regions of the high domain regions is large, and the configuration viewing angle of the high domain regions is good, and the configuration of the high domain regions reduces the aperture area and thus sacrifices the aperture ratio; with respect to a solution of configuring the first pixels 111 and the second pixels 112 as low domain regions, the configuration of the low domain regions allows the aperture area to be relatively large and the aperture ratio to be high. However, the viewing angle will be poor, so that the customer experience will be poor. In this solution, the high domain region and the low domain region are hybrid and configured; the configuration of the low domain region ensures a certain transmittance, and the configuration of the high domain region improves color shift of a large view angle, so that the hybrid configuration of the high domain region and the low domain region improves color shift and the quality of the display panel 110 at a large viewing angle of the product while ensuring a certain transmittance. The number of alignment regions of pixels in the same row or in the same column is the same, and the same row or the same column of a photo mask has the same number of alignment regions; a pattern is the same, and the design of the photo mask is simpler.

Figure 6:
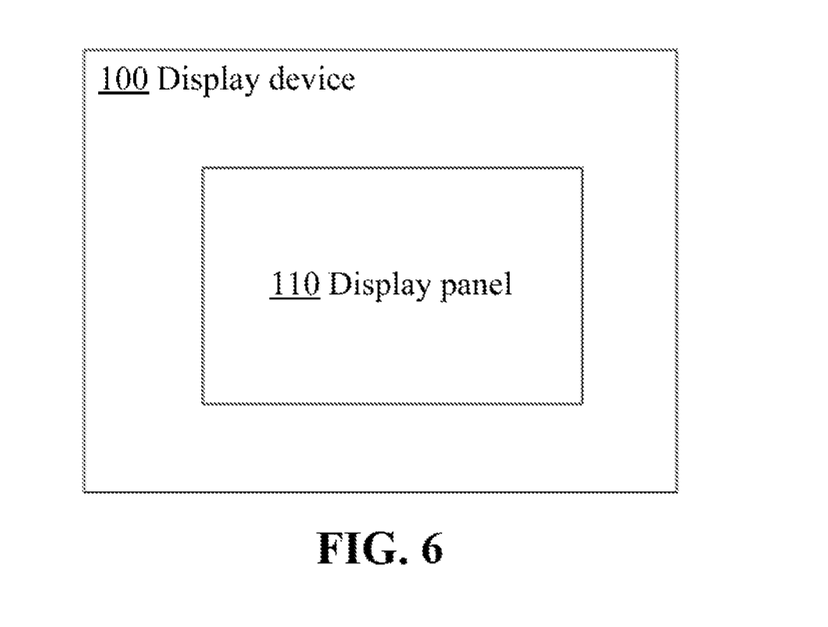
FIG. 6 is a schematic view of a display device according to an embodiment of the present application.

As another embodiment of the present application, referring to FIG. 6, a display device 100 is disclosed, including the display panel 110 as described above.

In this solution, the display panel 110 includes first pixels 111 and second pixels 112; the number of the first pixels 111 and the number of the second pixels 112 are plural; the first pixels 111 are correspondingly configured as a high domain region, and the second pixels 112 are correspondingly configured as a low domain region. The number of alignment regions of the first pixels 111 and the number of alignment regions of the second pixels 112 are different. With respect to a solution of configuring the first pixels 111 and the second pixels 112 as high domain regions, the number of the alignment regions of the high domain regions is large, and the configuration viewing angle of the high domain regions is good, and the configuration of the high domain regions reduces the aperture area and thus sacrifices the aperture ratio; with respect to a solution of configuring the first pixels 111 and the second pixels 112 as low domain regions, the configuration of the low domain regions allows the aperture area to be relatively large and the aperture ratio to be high. However, the viewing angle will be poor, so that the customer experience will be poor. In this solution, the high domain region and the low domain region are hybrid and configured; the configuration of the low domain region ensures a certain transmittance, and the configuration of the high domain region improves color shift of a large view angle, so that the hybrid configuration of the high domain region and the low domain region improves color shift and the quality of the display panel 110 at a large viewing angle of the product while ensuring a certain transmittance. The number of alignment regions of pixels in the same row or in the same column is the same, and the same row or the same column of a photo mask has the same number of alignment regions; a pattern is the same, and the design of the photo mask is simpler.

It should be noted that it is not determined that the limitation of each step involved in this solution limits the sequence of steps on the premise of affecting the implementation of the specific solution. The previous steps may be performed first, or may also be executed later, or even executed at the same time, which should be considered as being within the scope of protection of the present application as long as this solution can be implemented.

The panel of the present application may be a twisted nematic (TN) panel, an in-plane switching (IPS) panel, or a multi-domain vertical alignment (VA) panel, and of course, the panel may also be other types of panels, as long as the panels are applicable.

The above are further detailed descriptions of the present application in conjunction with the specific optional embodiments, but the specific implementation of the present application cannot be determined as limited to these descriptions. For a person of ordinary skill in the art to which the present application pertains, a number of simple deductions or substitutions may also be made without departing from the concept of the present application. All these should be considered as falling within the scope of protection of the present application.

What is claimed is:

1. A display panel, comprising:
   a plurality of first pixels and a plurality of second pixels, wherein a color of each first pixel is different from that of each second pixel;
   the first pixels are configured as a high domain region, and the second pixels are configured as a low domain region; the number of alignment regions of the high domain region is greater than that of alignment regions of the low domain region; and
   the brightness of the first pixels is higher than that of the second pixels;
   wherein the display panel comprises white pixels; the white pixels are the first pixels, and the white pixels are correspondingly configured as a high domain region;
   wherein the display panel comprises third pixels and fourth pixels; the second pixels and the third pixels correspond to low domain regions; and the brightness of the first pixels is highest;
   the brightness of the fourth pixels is lowest, and the fourth pixels are correspondingly configured as a high domain region.

2. The display panel according to claim 1, wherein the low domain region has four alignment regions, and the high domain region has eight alignment regions.

3. The display panel according to claim 2, wherein the display panel comprises gate scan layers and common lines, and the first pixels each comprise a main pixel and sub-pixels; the first pixels corresponding to the same gate scan layer are provided with three thin film transistors; drain electrodes of two of the thin film transistors are connected with the main pixel and the sub-pixels respectively, and source electrodes are connected with a same data line; a source electrode of the other thin film transistor is connected with the sub-pixels corresponding to the upper gate scan layer, and a drain electrode is connected to the common lines.

4. A display device, comprising a display panel, wherein the display panel comprises:
   a plurality of first pixels and a plurality of second pixels, wherein a color of each first pixel is different from that of each second pixel;
   the first pixels are configured as a high domain region, and the second pixels are configured as a low domain region; the number of alignment regions of the high domain region is greater than that of alignment regions of the low domain region; and
   the brightness of the first pixels is higher than that of the second pixels;
   wherein the display panel comprises white pixels; the white pixels are the first pixels, and the white pixels are correspondingly configured as a high domain region;
   wherein the display panel comprises third pixels and fourth pixels; the second pixels and the third pixels correspond to low domain regions; and the brightness of the first pixels is highest;
   the brightness of the fourth pixels is lower, and the fourth pixels are correspondingly configured as a high domain region.

5. The display device according to claim 4, wherein the low domain region has four alignment regions, and the high domain region has eight alignment regions; the display panel comprises gate scan layers and common lines, and the first pixels each comprise a main pixel and sub-pixels; the first pixels corresponding to the same gate scan layer are provided with three thin film transistors; drain electrodes of two of the thin film transistors are connected with the main pixel and the sub-pixels respectively, and source electrodes are connected with a same data line; a source electrode of the other thin film transistor is connected with the sub-pixels corresponding to the upper gate scan layer, and a drain electrode is connected to the common lines.

* * * * *